US008655417B2

(12) United States Patent
Lin

(10) Patent No.: US 8,655,417 B2
(45) Date of Patent: Feb. 18, 2014

(54) VIDEO/AUDIO PLAYING APPARATUS WITH WIRELESS SIGNAL TRANSMISSION FUNCTION AND WIRELESS VIDEO/AUDIO TRANSMISSION MODULE THEREOF

(76) Inventor: Pi-Fen Lin, Taipei (TW)

(*) Notice: Subject to any disclaimer, the term of this patent is extended or adjusted under 35 U.S.C. 154(b) by 1206 days.

(21) Appl. No.: 12/076,667

(22) Filed: Mar. 21, 2008

(65) Prior Publication Data

US 2009/0238396 A1 Sep. 24, 2009

(51) Int. Cl.
*H04M 1/00* (2006.01)

(52) U.S. Cl.
USPC .................... 455/569.1; 455/575.2; 381/370

(58) Field of Classification Search
USPC ............ 455/41.1–41.3, 575.3, 550.1, 575.2, 455/569.1, 575.1; 381/370, 74, 367, 376, 381/309, 330, 71.6, 380–381; 379/174, 379/430, 431
See application file for complete search history.

(56) References Cited

U.S. PATENT DOCUMENTS 6,272,359 B1 * 8/2001 Kivela et al. .................. 455/567
8,041,062 B2 * 10/2011 Cohen et al. .................. 381/315
8,447,031 B2 * 5/2013 Usher et al. .................. 379/430
2001/0030850 A1 * 10/2001 Ditzik .......................... 361/683
2006/0166715 A1 * 7/2006 Van Engelen et al. ..... 455/575.2
2007/0167185 A1 * 7/2007 Bjerrum-Niese .......... 455/550.1
2007/0254696 A1 * 11/2007 Kajitani ...................... 455/556.1
2008/0167087 A1 * 7/2008 Tang et al. ................. 455/569.1
2008/0311960 A1 * 12/2008 Kim et al. .................. 455/569.1

* cited by examiner

*Primary Examiner* — Nay A Maung
*Assistant Examiner* — Angelica M Perez
(74) *Attorney, Agent, or Firm* — Rosenberg, Klein & Lee

(57) ABSTRACT

A video/audio playing apparatus with wireless audio signal transmission function comprising: a headset place slot, an audio processing module, a wireless audio signal transmission module, and a system audio interface. The headset place slot can accept and electrically connect a wireless headset, and transmits an electric potential signal. The audio processing module is used for outputting an audio signal. The wireless audio signal transmission module further comprises: an audio signal switching unit and a control unit. The audio signal switching unit is used for receiving the audio signal, and switches the output path of audio signal according to the electric potential signal. The control unit connects to the audio signal switching unit and connects to the wireless headset using wireless. Thus, the audio signal switching unit can switch the wireless headset or the system audio interface to output the audio signal according to the electric potential signal.

11 Claims, 4 Drawing Sheets

VIDEO/AUDIO PLAYING APPARATUS WITH WIRELESS SIGNAL TRANSMISSION FUNCTION AND WIRELESS VIDEO/AUDIO TRANSMISSION MODULE THEREOF

BACKGROUND OF THE INVENTION

1. Field of the Invention

The present invention relates to a video/audio playing apparatus, and more particularly to a video/audio playing apparatus with a wireless audio signal transmission function and its wireless audio signal transmission module.

2. Description of Related Art

As video/audio multimedia technology develops rapidly, the technologies and types of video/audio players (such as televisions, stereos, multimedia players and computer multimedia centers, etc) advance and grow accordingly, and their designs support various different video/audio formats and additional functions to provide better visual and auditory effects.

In general, people turn up the volume of a video/audio playing apparatus to enjoy the lifelike blast sound and create a nuisance to neighbors. To improve the situation, some users use a cable earphone to enjoy the auditory effect. Although this method can avoid disturbing others, users are limited by the connection of the cable, and the application give tremendous inconvenience to the user's activity.

Due to the development of wireless transmission technologies, all kinds of wireless transmission technology related products are introduced to the market, and some users adopt a Bluetooth wireless headset that operates with a Bluetooth transceiver to solve the aforementioned problem. However, in practical applications, users have to connect a Bluetooth transceiver to the video/audio playing apparatus first and then connect the Bluetooth wireless headset for the application. Obviously, related implementation, installation, and storage for such application are inconvenient.

Since output paths of the sound source of the wireless headset and the video/audio playing apparatus are independent to each other, users have to mute the video/audio playing apparatus before listening to the wireless headset in order to prevent affecting the auditory effect of the wireless headset. All of the aforementioned inconvenient factors discourage consumers to purchase the optional wireless headset and wireless transceiver.

SUMMARY OF THE INVENTION

In view of the foregoing shortcomings of the prior art, it is a primary objective of the present invention to overcome the shortcomings of the prior art by integrating a wireless audio signal transmission module and a video/audio playing apparatus, so that the video/audio playing apparatus has a function of transmitting wireless audio signals to a wireless headset. With the design of a wireless audio signal transmission module, the video/audio playing apparatus can directly switch an output path of the audio signal according to the connection and application of the wireless headset. In addition to the wireless audio signal transmission function, the video/audio playing apparatus further provides a simple and easy way for users to control the switching of the output path of the video/audio playing apparatus by selectively storing the wireless headset into a place slot.

To achieve the foregoing objective, the present invention provides a video/audio playing apparatus with a wireless audio signal transmission function, and the apparatus comprises: a headset place slot, an audio processing module, a wireless audio signal transmission module and a system audio interface, wherein the headset place slot is provided for containing and electrically coupling a wireless headset, and transmitting an electric potential signal, and the audio processing module is provided for outputting an audio signal. The wireless audio signal transmission module further comprises: an audio signal switching unit and a control unit, wherein the audio signal switching unit is provided for receiving the audio signal, and switching an output path of the audio signal according to the electric potential signal. The control unit is connected to the audio signal switching unit for connecting the wireless headset via a wireless connection, and outputting the audio signal from the wireless headset according to the switching of the audio signal switching unit. Further, the system audio interface is connected to the audio signal switching unit for outputting the audio signal according to the switching of the audio signal switching unit.

To achieve the foregoing objective, the present invention provides a video/audio playing apparatus of a wireless audio signal transmission, and the apparatus comprises: a main body and a wireless audio signal transmission module, wherein the main body includes a system audio interface and an audio processing module, and the audio processing module is provided for outputting an audio signal to the system audio interface. The wireless audio signal transmission module is installed outside the main body and inserted to the system audio interface, and further comprises: a headset place slot, an audio signal switching unit, a control unit and a module sound source interface. The headset place slot is provided for containing and electrically coupling a wireless headset and transmitting an electric potential signal, and the audio signal switching unit is provided for receiving the audio signal and switching an output path of the audio signal according to the electric potential signal. The control unit is connected to the audio signal switching unit and also connected to the wireless headset via a wireless connection for outputting the audio signal of the wireless headset according to the switching of the audio signal switching unit. The module sound source interface is connected to the audio signal switching unit for outputting the audio signal according to the switching of the audio signal switching unit.

To achieve the foregoing objective, the present invention provides a wireless audio signal transmission module applied to a video/audio playing apparatus for receiving an audio signal outputted by the video/audio playing apparatus, and transmitting signals to a wireless headset via a wireless transmission. The invention comprises: a control unit, a connecting interface and an audio signal switching unit. The control unit is connected to the wireless headset via a wireless connection for outputting the audio signal through the wireless headset, and the connecting interface is electrically coupled to a headset place slot for transmitting an electric potential signal. Further, the audio signal switching unit is provided for receiving the audio signal, and connecting the control unit and a speaker, and switching an output path of the audio signal according to the electric potential signal. If the wireless headset is placed into the headset place slot, the audio signal switching unit will switch the connection to the speaker. If the wireless headset is not placed into the headset place slot, the audio signal switching unit will switch the connection to the control unit, for outputting the audio signal through different output paths.

Therefore, the video/audio playing apparatus has a wireless audio signal transmission function, and uses a simple and easy way of switching the output path of the video/audio playing apparatus by selectively storing the wireless headset.

To make it easier for our examiner to understand the expected objectives, technical measures and effects of the present invention, we use preferred embodiments together with the attached drawings for the detailed description of the invention, but it should be pointed out that the attached drawings are provided for reference and description only, but not for limiting the present invention.

DETAILED DESCRIPTION OF THE PREFERRED EMBODIMENTS

The present invention integrates a wireless audio signal transmission module and a video/audio playing apparatus, so that the video/audio playing apparatus not only can output the audio signal from the original speaker, but also can output the audio signal from the wireless headset connected via a wireless connection. In addition, different output paths can be switched by a simple connection of the wireless headset, so that users can easily switch the output path without changing their original using habits. In practical applications, the wireless audio signal transmission module of the invention is designed by a specification of a Bluetooth technology, a far infrared technology or a radio frequency (RF) technology.

Figure 1:
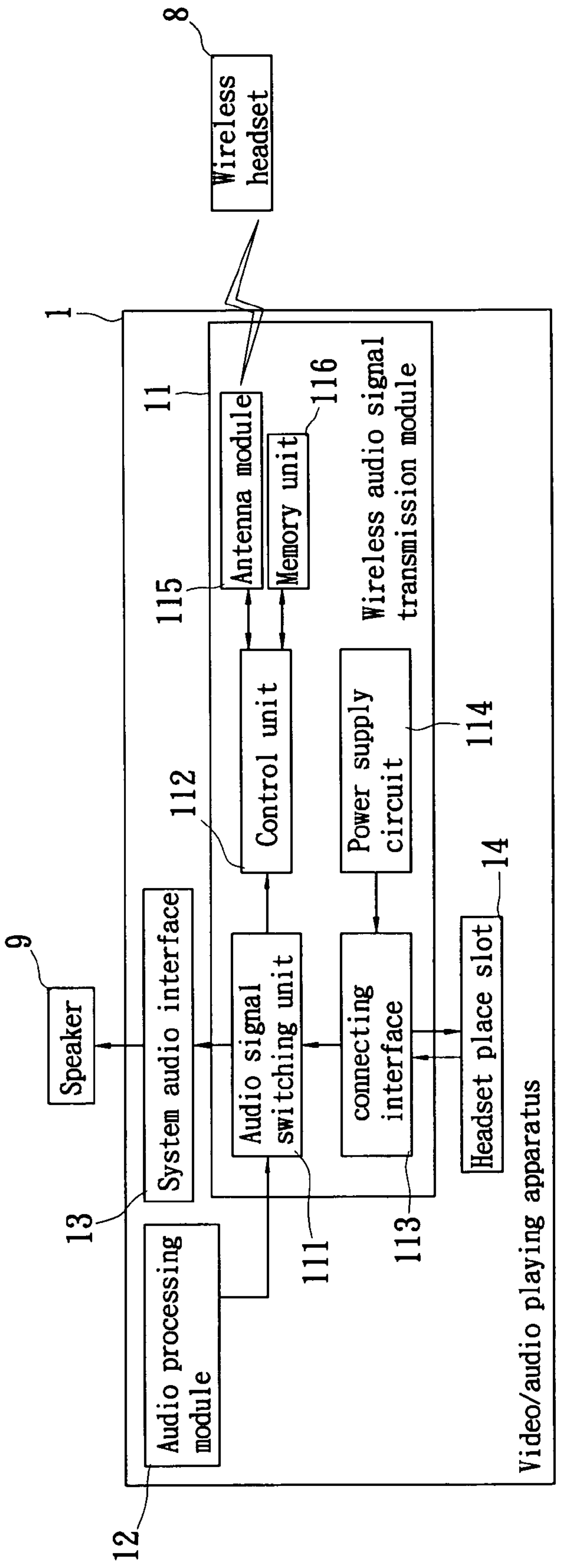
FIG. 1 is a block diagram of a video/audio playing apparatus with a wireless audio signal transmission function in accordance with a first preferred embodiment of the present invention.

Referring to FIG. 1 for a block diagram of a video/audio playing apparatus with a wireless audio signal transmission function in accordance with a first preferred embodiment of the present invention, the video/audio playing apparatus 1 comprises: a wireless audio signal transmission module 11, an audio processing module 12, a system audio interface 13 and a headset place slot 14. The wireless audio signal transmission module 11 of this embodiment is designed with a built-in video/audio playing apparatus 1.

The headset place slot 14 is provided for containing and electrically connecting a wireless headset 8 and generating an electric potential signal. The audio processing module 12 refers to a processing module for processing and playing an audio signal in a video/audio playing apparatus 1, and outputting the processed audio signal. The system audio interface 13 can be designed as a slot connected to a sound source for connecting the video/audio playing apparatus 1 to a speaker 9 to output the audio signal.

The wireless audio signal transmission module 11 is connected to the audio processing module 12 and the headset place slot 14, and further comprises: an audio signal switching unit 111, a control unit 112, a connecting interface 113, a power supply circuit 114, an antenna module 115 and a memory unit 116. The control unit 112 is connected to the antenna module 115 for connecting the wireless headset 8 via a wireless connection, and the connecting interface 113 is provided for connecting the headset place slot 14 to transmit the electric potential signal to the audio switching unit 111. Further, the audio signal switching unit 111 is connected to the control unit 112 and the system audio interface 13 for receiving the audio signal, and switching an output path of the audio signal according to the electric potential signal. In other words, the audio signal switching unit 111 switches the output path according to the electric potential signal, and outputs the audio signal from the wireless headset 8 through the control unit 112, or outputs the audio signal from the speaker 9 through the system audio interface 13.

It is noteworthy to point out that the electric potential signal transmitted from the headset place slot 14 is produced according to the condition whether or not the wireless headset 8 is placed into the headset place slot 14 in the actual application. For example, the actual design of the wireless headset 8 usually comes with an independent power supply (which is in a high potential), so that if the wireless headset 8 is placed into the headset place slot 14 (whose connection is not shown in the figure), then it means that the wireless headset 8 is not being used by users, and thus the headset place slot 14 can transmit a high electric potential signal provided by the wireless headset 8 to audio signal switching unit 111 through the contact with the independent power supply of the wireless headset 8 to switch the connection of the audio signal switching unit 111 to the system audio interface 13, and output the audio signal from the speaker 9.

On the other hand, if the wireless headset 8 is not placed into the headset place slot 14, then it means that the wireless headset 8 is being used, and thus the headset place slot 14 just transmits a low electric potential signal to the audio signal switching unit 111, such that the audio signal switching unit 111 sends the audio signal to the control unit 112 to output from the wireless headset 8. In actual design, the low electric potential signal is achieved by a pull low resistor circuit to prevent an unstable low electric potential signal caused by signal interferences.

Further, the power supply circuit 114 receives power supplied by video/audio playing apparatus 1 to produce electric power and connects to the connecting interface 113, such that if wireless headset 8 is placed into the headset place slot 14, the electric power is supplied to the wireless headset 8. In addition to the design of having an independent power supply, the wireless headset 8 further includes a charging circuit (not shown in the figure) for charging a headset battery (not shown in the figure) in the wireless headset 8 after receiving the power. Finally, the wireless audio signal transmission module 11 includes a memory unit 116 such as a firmware for accesses during the operation of the control unit 112.

Figure 2:
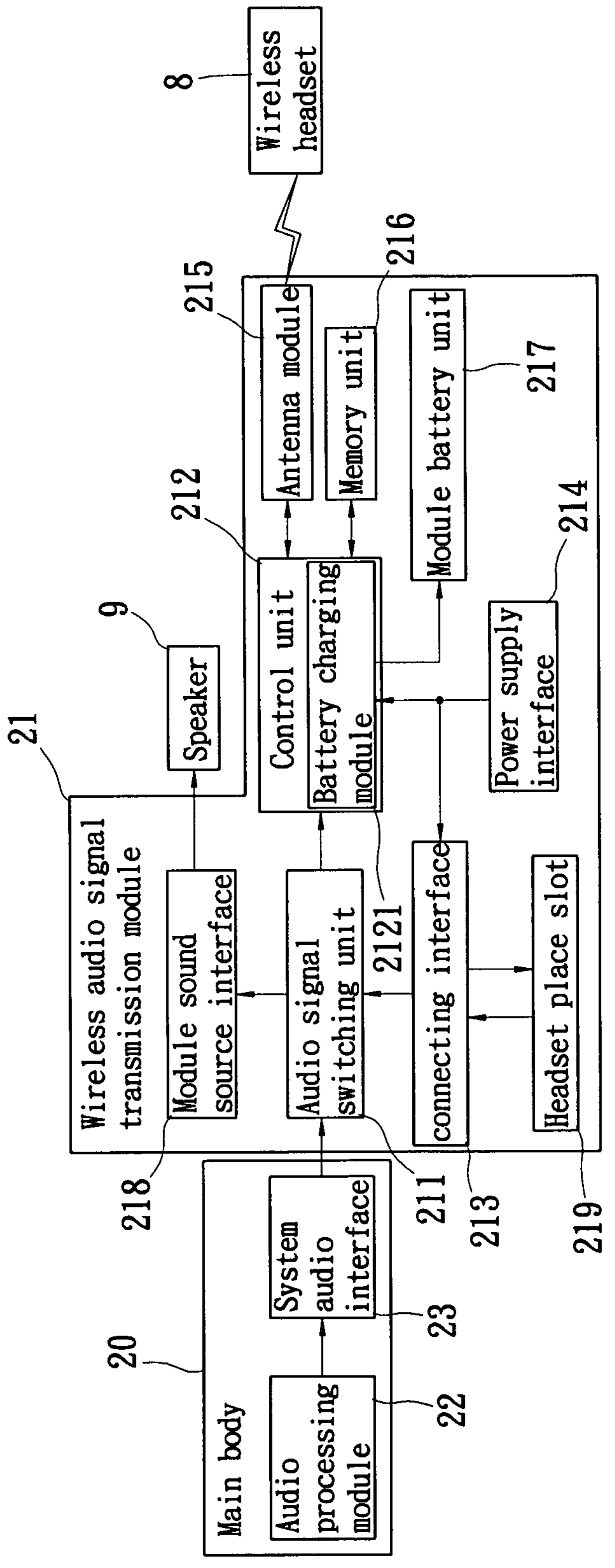
FIG. 2 is a block diagram of a video/audio playing apparatus with a wireless audio signal transmission function in accordance with a second preferred embodiment of the present invention.

Referring to FIG. 2 for a block diagram of a video/audio playing apparatus with a wireless audio signal transmission function in accordance with a second preferred embodiment of the present invention, the principle of operation of this embodiment is substantially the same as the first preferred embodiment, and the major difference resides on the hardware of the video/audio playing apparatus. In this embodiment, the wireless audio signal transmission module 21 is connected to the exterior of a main body 20 of the video/audio playing apparatus.

The main body 20 of the video/audio playing apparatus comprises an audio processing module 22 and a system audio interface 23 (such as a sound source slot). The audio processing module 22 is also provided for outputting an audio signal to the system audio interface 23. The wireless audio signal transmission module 21 is inserted to the system audio interface 23 for receiving an audio signal outputted by the audio processing module 22.

Further, the wireless audio signal transmission module 21 is provided for transmitting audio signals to a wireless headset 8 via a wireless transmission, and further comprises: an audio signal switching unit 211, a control unit 212, a connecting interface 213, a power supply interface 214, an antenna module 215, a memory unit 216, a module battery unit 217, a module sound source interface 218 and a headset place slot 219. The control unit 212 is connected to the antenna module 215 for connecting the wireless headset 8 via a wireless transmission through the antenna module 215. The module sound source interface 218 is connected to a speaker 9, and the headset place slot 219 is provided for containing and electrically connecting the wireless headset 8 to transmit an electric potential signal, when users stop using the wireless headset 8.

The control unit 212 and module sound source interface 218 is connected to the audio signal switching unit 211, and the audio signal switching unit 211 is provided for receiving the audio signal and switching an output path of the audio signal according to the electric potential signal. Therefore, the audio signal switching unit 211 switches the output path according to the electric potential signal, and outputs the audio signal from the wireless headset 8 through the control unit 212, or outputs the audio signal from the speaker 9 through the module sound source interface 218.

The connecting interface 213 is connected between the headset place slot 219 and the audio signal switching unit 211 for providing the electric potential signal transmitted by the headset place slot 219 to the audio signal switching unit 211. The transmitted electric potential signal refers to an electric potential signal that is generated according to the actual situation of whether or not the wireless headset 8 is placed into the headset place slot 219. The electric potential signal has been defined previously in the first preferred embodiment, and thus will not be given here. Similarly, the external connecting design of this embodiment can achieve the purpose of switching the output path.

Since the wireless audio signal transmission module 21 adopts the external connecting design, a module battery unit 217 is designed as an independent power supply for supplying power for the operation of the wireless audio signal transmission module 21. The power supply interface 214 can be a DC power supply connecting interface (or a DC connector) for receiving and converting utility power into a power supply outputted to the wireless audio signal transmission module 21 when the power of the module battery unit 217 is exhausted. The control unit 212 further includes a battery charging module 2121, so that when the power supply interface 214 is connected to the utility power, the power converted by the power supply interface 214 is received for charging the module battery unit 217.

The power supply interface 214 is connected to the connecting interface 213 for supplying power to the wireless headset 8 through the connecting interface 213 and the headset place slot 219. The wireless headset 8 further includes a charging circuit (not shown in the figure) for receiving the power supply directly to change a headset battery (not shown in the figure) in the wireless headset 8, if the wireless headset 8 is placed into the headset place slot 219.

In addition, the design of the main body 20 of the video/audio playing apparatus comes with a place slot (not shown in the figure) for inserting the wireless audio signal transmission module 21 into the system audio interface 23, such that when the wireless audio signal transmission module 21 is connected externally to the main body 20, the audio signal transmission module 21 can be installed further into the headset place slot to improve the aesthetic look and reduce the occupying space.

Figure 3:
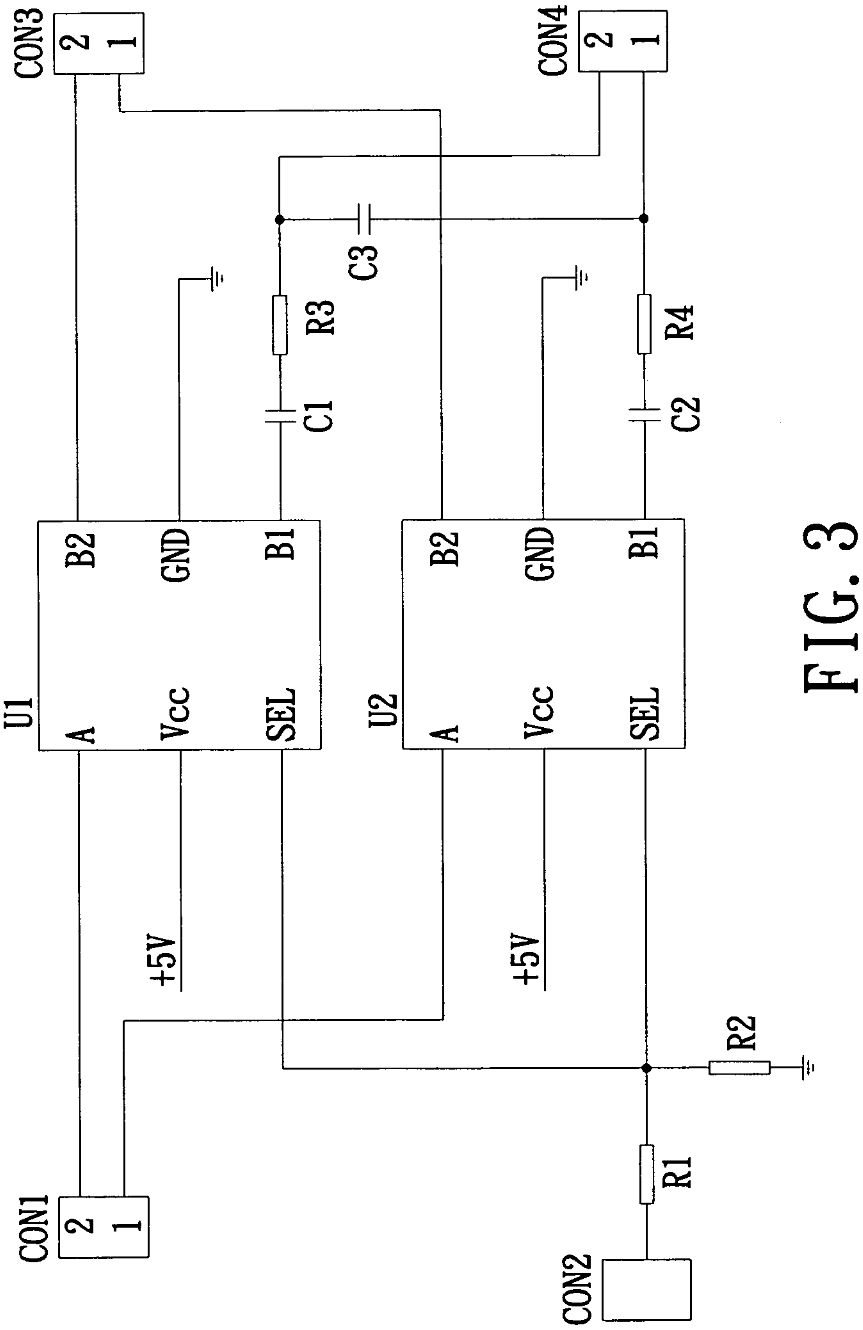
FIG. 3 is a schematic circuit diagram of an audio signal switching unit in accordance with the present invention.

To further describe the principle of operation of the present invention, we provide FIG. 3 to illustrate the circuit of an audio signal switching unit in accordance with a preferred embodiment of the present invention, wherein the audio signal switching unit includes two controllers U1 and U2 for processing the left and right channels of a sound source respectively.

The connector CON1 is provided for receiving and transmitting an audio signal (which is a signal source) outputted by a sound source processing module. The connector CON2 is provided for receiving an electric potential signal transmitted by the connecting interface. The connector CON3 is one of the output paths of the audio signal for connecting the control unit, and the connector CON4 is another output path of the audio signal for connecting the speaker by the sound source interface. Therefore, the controllers U1, U2 switch different output paths by the electric potential signal transmitted from the connector CON2.

When a user is using the wireless headset, the user removes the wireless headset from the headset place slot, and thus the electric potential signal received by the connector CON2 is a low electric potential signal. As to the circuit design, a resistor R2 can be grounded to assure that the controllers U1, U2 can receive the low electric potential signal. Therefore, the controllers U1, U2 will switch the connection for transmitting the audio signal received by the connector CON1 to the connector CON3 and the control unit, so that the user can hear the audio signal from the wireless headset.

When the user is not using the wireless headset, the user places the wireless headset at the headset place slot, and thus the connector CON2 will receive a high electric potential signal provided by the wireless headset. Therefore, the controllers U1, U2 will switch the connection for transmitting the audio signal received by the connector CON1 to the connector CON4 and the sound source interface, so that the audio signal cannot outputted from the speaker connected to the sound source interface.

Of course, the persons skilled in the art can understand the use of each connector as described in the aforementioned circuit diagram, and the description above is provided for the purpose of illustrating the invention, but the actual design may adopt by direct circuit layout or any equivalent method.

Figure 4A:
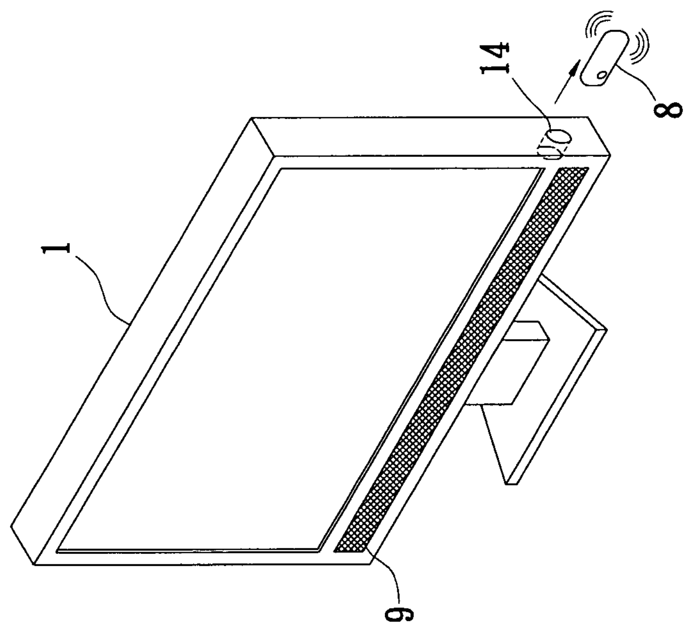
FIGS. 4A and 4B are schematic views of applications of a video/audio playing apparatus with a wireless audio signal transmission function in accordance with the present invention.
Figure 4B:
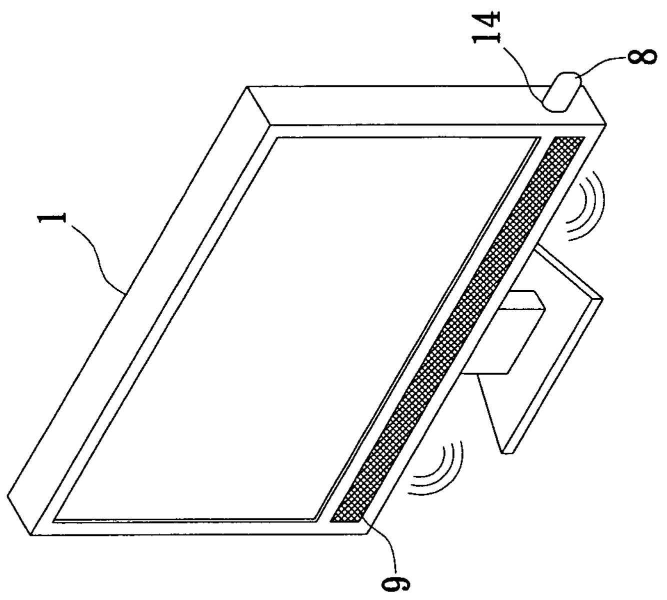

Referring to FIGS. 4A and 4B for schematic views of applications of a video/audio playing apparatus with a wireless audio signal transmission function in accordance with the present invention, the video/audio playing apparatus 1 is a television in this embodiment, and the wireless audio signal transmission module 11 is built in the television.

In FIG. 4A, if a user wants to use the wireless headset 8 and removes the wireless headset 8 from the headset place slot 14, the audio signal played by the video/audio playing apparatus 1 is outputted from the wireless headset 8, and the speaker 9 connected to the video/audio playing apparatus 1 will stop outputting any sound. If the Bluetooth wireless transmission technology is adopted in the design, if the user is listening to a sound of an audio signal played by the video/audio playing apparatus 1 through a Bluetooth headset, the Bluetooth headset will switch to a Bluetooth connection to connect other Bluetooth devices (such as a mobile phone). If other Bluetooth devices finish their use, the application will be switched back to the video/audio playing apparatus 1 for a continual listening to the sound corresponding to the audio signal.

In FIG. 4B, if the user places the wireless headset 8 back to the headset place slot 14, the sound corresponding to the audio signal played by the video/audio playing apparatus 1 will be switched automatically to the speaker 9 for the output. Now, the wireless headset 8 will stop operating.

In summation of the description above, the present invention makes use of a simple reduced circuit design to integrate the wireless audio signal transmission module and the video/audio playing apparatus, so that the video/audio playing apparatus has the wireless audio signal transmission function for transmitting signals to the wireless headset via a wireless transmission. The video/audio playing apparatus can switch different output paths of the audio signal directly according to the connection and application condition of the wireless headset. In addition to the wireless audio signal transmission function, the video/audio playing apparatus also allows users to switch the output path of the video/audio playing apparatus by selectively placing the wireless headset into the headset place slot without requiring a change of the user's original using habit.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A television with a wireless audio signal transmission function, comprising:

a headset place slot, used for containing and electrically coupling a wireless headset, determining whether or not the wireless headset is in connection with the headset place slot, and transmitting an electric potential signal; wherein the wireless headset includes a chargeable battery and a charging circuit used for receiving electric power to charge the battery;

an audio processing module used for outputting an internal audio signal;

a system audio interface, coupled to a speaker, used for outputting the internal audio signal through the speaker upon a receipt of the internal audio signal; and a wireless audio signal transmission module, comprising:

a control unit capable of communicating with the wireless headset via a wireless connection and outputting the internal audio signal to the wireless headset;

an audio signal switching unit, selectively coupled with the system audio interface and the control unit depending on a voltage level of the electric potential signal outputted to the internal audio signal switching unit, used for receiving the internal audio signal, and determining whether or not to output the received internal audio signal to the system audio interface or the control unit;

a connecting interface, coupled to the headset place slot, used for transmitting the electric potential signal to the internal audio signal switching unit; and a power supply circuit, coupled to the connecting interface, used for providing electric power to charge the battery of wireless headset through the charging circuit when the wireless headset is placed into the headset place slot and electrically connected with the connecting interface via charging contacts;

wherein:

when the electric potential signal is a high electric potential signal, indicating the wireless headset is placed into the headset place slot, the audio signal switching unit is coupled to the system audio interface before outputting the internal audio signal to the system audio interface; when the electric potential signal is a low electric potential signal indicating the wireless headset is not placed into the headset place slot, the audio signal switching unit is coupled to the control unit before outputting the internal audio signal to the control unit;

wherein the wireless headset is used to receive the internal audio signal transmitted from the control unit and at least one external audio signal transmitted from an external device, and the wireless headset outputs the external audio signal while skipping the internal audio signal at the time of receiving the internal audio signal and the external audio signal substantially simultaneously.

2. The television with the wireless audio signal transmission function of claim 1, wherein the wireless audio signal transmission module is designed according to a specification selected from the collection of a Bluetooth™ technology, a far infrared technology and a radio frequency (RF) technology.

3. The television with the wireless audio signal transmission function of claim 1, wherein the wireless audio signal transmission module further comprises:

a memory unit, used for storing a program required for operating the control unit; and an antenna module, coupled to the control unit, used for connecting the wireless headset via the wireless connection.

4. The television with the wireless audio signal transmission function of claim 1, further comprises a system audio interface coupled to the speaker.

5. A television with a wireless audio signal transmission function, comprising:

a main body, having a system audio interface and an audio processing module used for outputting an internal audio signal to the system audio interface; and a wireless audio signal transmission module installed outside the main body and inserted to the system audio interface, further comprising:

a headset place slot, used for containing and electrically coupling a wireless headset, determining whether or not the wireless headset is in connection with the headset place slot, and transmitting an electric potential signal; wherein the wireless headset includes a chargeable battery and a charging circuit used for receiving electric power to charge the battery;

an audio signal switching unit, used for receiving the internal audio signal;

a control unit, capable of communicating with the wireless head set and outputting the internal audio signal to the wireless headset via a wireless connection;

a connecting interface, coupled to the headset place slot, used for transmitting the electric potential signal to the audio signal switching unit; and a power supply circuit, used for receiving power from an electric power and electrically connecting with the connecting interface; wherein the power supply circuit converts and outputs electric power to charge the wireless headset when the wireless headset is placed into the headset place slot;

wherein the audio signal switching unit is selectively coupled to the control unit and the system audio interface depending on a voltage level of the electric potential signal indicative of whether or not the wireless headset is in connection with the headset place slot;

wherein:

when the electric potential signal is a high electric potential signal, indicative of the wireless headset is placed into the headset place slot, the audio signal switching unit is coupled to the audio system interface before sending the internal audio signal to the system audio interface; when the electric potential signal is a low electric potential signal indicating the wireless headset is not placed into the headset place slot, the audio signal switching unit is coupled to the control unit before sending the internal audio signal to the control unit;

wherein the wireless headset is used to receive the internal audio signal transmitted from the control unit and at least one external audio signal transmitted from an external device, and the wireless headset outputs the external audio signal while skipping the internal audio signal at the time of receiving the internal audio signal and the external audio signal substantially simultaneously.

6. The television with the wireless audio signal transmission function of claim 5, wherein the wireless audio signal transmission module is designed according to a specification selected from the collection of a Bluetooth™ technology, a far infrared technology and a radio frequency (RF) technology.

7. The television with the wireless audio signal transmission function of claim 5, wherein the wireless audio signal transmission module further comprises:

a module battery unit.

8. The television with the wireless audio signal transmission function of claim 7, wherein the wireless control unit further comprises:

a battery charging module, used for receiving the electric power converted and outputted by the power supply circuit to charge the module battery unit.

9. The television with the wireless audio signal transmission function of claim 5, wherein the wireless audio signal transmission module further comprises:

a memory unit, used for storing a program required for the operation the control unit; and an antenna module, coupled to the control unit, used for connecting the control unit to the wireless headset via the wireless connection.

10. The television with the wireless audio signal transmission function of claim 5, further comprises a module sound source interface coupled to the speaker.

11. The television with the wireless audio signal transmission function of claim 5, wherein the main body further comprises a housing with a place slot used for containing the wireless audio signal transmission module.

* * * * *